United States Patent
Breuer et al.

(10) Patent No.: US 10,419,952 B2
(45) Date of Patent: Sep. 17, 2019

(54) METHOD FOR OPERATION AN ENHANCED COVERAGE WIRELESS COMMUNICATION DEVICE IN A CELLULAR NETWORK

(71) Applicant: GEMALTO M2M GmbH, Munich (DE)

(72) Inventors: Volker Breuer, Boetzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 15/751,221

(22) PCT Filed: Aug. 2, 2016

(86) PCT No.: PCT/EP2016/068461
§ 371 (c)(1),
(2) Date: Feb. 8, 2018

(87) PCT Pub. No.: WO2017/025389
PCT Pub. Date: Feb. 16, 2017

(65) Prior Publication Data
US 2018/0249352 A1  Aug. 30, 2018

(30) Foreign Application Priority Data
Aug. 13, 2015  (EP) ..................... 15180853

(51) Int. Cl.
*H04L 29/06* (2006.01)
*H04W 4/021* (2018.01)
(Continued)

(52) U.S. Cl.
CPC ............. *H04W 24/02* (2013.01); *H04L 67/42* (2013.01); *H04W 4/021* (2013.01); *H04W 24/08* (2013.01); *H04W 48/20* (2013.01); *H04W 4/70* (2018.02)

(58) Field of Classification Search
None
See application file for complete search history.

(56) References Cited

U.S. PATENT DOCUMENTS

2014/0362716 A1  12/2014  Zhang et al.
2016/0135141 A1* 5/2016  Burbidge .............. H04W 68/02
                                                                    455/458
(Continued)

OTHER PUBLICATIONS

International Search Report (PCT/ISA/210) dated Oct. 26, 2016, by the European Patent Office as the International Searching Authority for International Application No. PCT/EP2016/068461.

(Continued)

*Primary Examiner* — Ajit Patel
(74) *Attorney, Agent, or Firm* — Buchanan Ingersoll & Rooney PC

(57) ABSTRACT

A method for operating a wireless communication device in a cellular network comprising a plurality of base nodes, the wireless communication device is operating in enhanced coverage mode with a first base node of the plurality of base nodes. The method comprises: —measuring signaling from at least one second base node, —determining an indication relating to the camping priority of said second base node, —in case the second base node has a higher camping priority than the first base node, but the second base node does not support enhanced coverage mode and said measured signaling indicates insufficient suitability of the second base node to serve the wireless communication device in normal coverage mode: —suspending measurement of signaling of the second base node, —measuring signaling from at least a third base node providing the same camping priority as the first base node.

15 Claims, 3 Drawing Sheets

(51) Int. Cl.
H04W 24/02 (2009.01)
H04W 48/20 (2009.01)
H04W 24/08 (2009.01)
H04W 4/70 (2018.01)

(56) References Cited

U.S. PATENT DOCUMENTS

2017/0013551 A1* 1/2017 Martin .................. H04W 48/18
2017/0164250 A1* 6/2017 Kim ...................... H04W 68/02

OTHER PUBLICATIONS

Written Opinion (PCT/ISA/237) dated Oct. 26, 2016, by the European Patent Office as the International Searching Authority for International Application No. PCT/EP2016/068461.

Samsung, Cell Selection/Reselection for Rel-13 MTC, 3GPP TSG RAN WG2 #89, R2-150504, Jan. 9-13, 2015, pp. 1-3, Athens, Greece. http://www.3gpp.org/ftp/tsg_ran/WG2_RL2/TSGR2_89/Docs/.

Evolved Universal Terrestrial Radio Access (E-UTRA), User Equipment (UE) procedures in idle mode (Release 12), 3GPP TS 36.304, V12.4.0, Mar. 23, 2015, pp. 1-38, Sophia-Antipolis Cedex, France.

ETSI MCC, Report of 3GPP TSG RAN WG2 meeting #89, 3GPP TSG-RAN Working Group 2 meeting #89bis, R2-151051, Apr. 20-24, 2015, pp. 1-117, Brastislava, Slovakia. http://www.3gpp.org/ftp/tsg_ran/WG2_RL2/TSGR2_89/Report/.

Sharp, Cell selection for MTC enhancement, 3GPP TSG-RAN WG2#89, R2-150449, Feb. 9-13, 2015, pp. 1-2, Athens, Greece. http.//www.3gpp.org/ftp/tsg_ran/WG2_RL2/TSGR2_89/Docs/.

Gemalto N.V., MTC cell re-selection and mobility implications, 3GPP TSG-RAN WG2 Meeting #91, R2-153068, Aug. 24-28, 2015, pp. 1-5, Beijing, China. http://www.3gpp.org/ftp/tsg_ran/WG2_RL2/TSGR2_91/Docs/.

* cited by examiner

METHOD FOR OPERATION AN ENHANCED COVERAGE WIRELESS COMMUNICATION DEVICE IN A CELLULAR NETWORK

FIELD OF THE INVENTION

The present invention relates to a method for operating a wireless communication device in a cellular network.

The invention also pertains to a wireless communication device using said method. The invention further relates to a base node of a cellular network operating with such wireless communication device.

BACKGROUND OF THE INVENTION

In the recent development of cellular technology standards, in particular for long term evolution (LTE), it is considered that certain types of devices, so-called low-cost (LC) devices, in particular machine type communication (MTC) devices, are operating in conditions where they do not have the optimal transmission and reception conditions in relation to base nodes resp. eNodeBs of the cellular network they are operating in. This affects as prominent example metering devices in basements, but other types of devices in extreme conditions may also be affected.

Hence as part of the 3GPP Release 13 definition for such LC devices it was suggested the so-called enhanced coverage (EC) mode. This solves said issues by allowing communication that way that by many repetitive receptions of the same data packets the receiver aggregates sufficient power until the data packets can be reliably read from the receiver. As a precondition the wireless communication device and the base node need to agree upon registration of the wireless communication device at the base node that on both sides of the air interface the enhanced coverage mode is activated. A precondition for that is that the base node supports EC devices, otherwise they were barred on that base node. The enhanced coverage support is performed up to a certain coverage enhancement limit which is also indicated by the base node, i.e. corresponding to the maximum of repetitions and resources a base node would spend for a user to achieve a certain coverage enhancement depth.

With the new enhanced coverage mode compared to the normal coverage (NC) mode, which complements to the known operating mode of wireless communication devices with a base node, further operation means need to be adapted as well.

One of this means is the mobility management. As part of that a wireless communication device operated in idle mode regularly looks up if—in particular due to a change of its location—another base node might serve better the wireless communication device.

As part of the definition of the enhanced coverage mode it is foreseen that base nodes operating in normal coverage have a higher camping priority for a wireless communication device than those in enhanced coverage. This applies when signals from a base node operating in normal coverage mode are receivable at the wireless communication device in sufficient quality, that means the suitability criterion S for a normal coverage base node is met. Hence for that situation it is defined that the wireless communication device will execute a reselection to that normal coverage base node and continue operating in normal coverage with that base node. From a power consumption perspective this is generally advantageous, as operating in normal mode requires less receive/transmit operations as especially for enhanced coverage mode subsequent repetitions and corresponding averaging is a mean to achieve the required additional coverage enhancement. Nevertheless to unconditionally apply this rule is disadvantageous for wireless communication devices that are operating under permanent enhanced coverage condition, e.g. when operated stationary. When such a wireless communication device, e.g. an electricity metering device, once decided to operate with a enhanced coverage base node, this is because there was no normal coverage base node available. As the metering device is not expected to move, and the cellular network topology remains most likely stable, each search for a normal coverage base node is expected to be unsuccessful and consequently in vain.

In this case a continuous search for a normal coverage base node would drain out the power of the wireless communication device, and all envisaged power saving of this rule would not be realized.

It is therefore the goal of present invention to overcome the mentioned disadvantages and to propose a solution for an in terms of power consumption improved operation of the wireless communication unit in a cellular network in enhanced coverage.

Further alternative and advantageous solutions would, accordingly, be desirable in the art.

SUMMARY OF THE INVENTION

For this it is according to a first aspect of the invention suggested a method for operating a wireless communication device according to claim 1. It is further suggested according to a second aspect of the invention a wireless communication device according to claim 10.

According to the first aspect it is proposed a method for operating a wireless communication device in a cellular network, the cellular network comprising a plurality of base nodes, the wireless communication device is operating in enhanced coverage mode with a first base node of the plurality of base nodes, wherein the method comprises the steps of:

measuring signaling from at least one second base node of said plurality of base nodes, determining an indication relating to the camping priority of said second base node, in case the second base node having a higher camping priority than the first base node, and for said camping priority the second base node being not supporting enhanced coverage mode and said measured signaling indicating insufficient suitability of the second base node to serve the wireless communication device in normal coverage mode:

suspending measurement of signaling of the second base node, measuring signaling from at least a third base node of said plurality of base nodes providing the same camping priority as the first base node.

The invention is based on the commonly known architecture of cellular networks according to cellular technology standards like long term evolution (LTE), also known as 4G cellular technology standard. Such cellular networks comprise a multitude of base nodes each covering a cell area such, that a wireless communication device located in this cell should be able to exchange transmission signals with the base node.

As part of that, the base nodes, resp. eNodeB, transmit in a dedicated broadcast channel a defined collection of system information preferably to the wireless communication devices which are operating with the respective base node. This operation relationship is called camping on a base node, and the base node where the wireless communication device is currently camping on is called active base node.

According to recent developments of technology standards it is foreseen to take into account the existence of low-cost devices supporting limited bandwidths. These wireless communication devices form a special class of devices—in particular machine type communication (MTC) devices—which comprise fewer resources for operating in the cellular network, and are generally operating in a different manner than mobile handsets.

Furthermore such low-cost devices might additionally be situated in places with only a comparably reduced receivable signaling power from the active base node. Such low-cost devices are able to compensate the reduced signaling power by repeating to read and evaluate the signals from the base node, in order to get sufficient coverage gain. This operation mode is called enhanced coverage mode and the respective low-cost devices are called enhanced coverage devices.

For allowing the enhanced coverage devices to do so, the active base node needs to support the enhanced coverage mode, which means that also transmissions are repeated.

As a matter of fact the reception of signals from the active base node consumes for the low-cost device higher power than when working in normal coverage mode. This is not only the case when payload is provided to the wireless communication device, but also for broadcast transmissions, like the System Information Blocks (SIB), which are expected to be read regularly by the wireless communication device.

While such broadcasted information are repeated as long as they are valid, enhanced coverage devices have the chance to receive and evaluate those signals as long as it needs to decode them. However, for dedicated information from the base node to a wireless communication device the base nodes have an upper limit of repetitions. Hence a wireless communication device might be able to receive the SIBs of an enhanced coverage base node but not decode other signals, in other words cannot camp on such base nodes.

Each wireless communication device is configured to regularly look for base nodes which are able to better serve the wireless communication device than the active base node.

As one of the criteria for better serving the wireless communication device it is for low-cost devices taken into account the power consumption with the active base node. This is the case that way that base nodes operating with a wireless communication device in enhanced coverage mode get assigned a low camping priority. That means, that when the wireless communication device detects a suitable base node with a higher camping priority, then it will preferably carry out a reselection to the base node with the higher camping priority.

Base nodes with higher camping priority are in particular those operated in normal coverage.

In particular for the case a wireless communication device is operating stationary, that means it is effectively not moving, it is however not preferable in terms of power consumption to continuously search for a base node with higher camping priority.

Here comes the inventive method into play. It provides an enhanced way of operating with the base nodes in proximity of the enhanced coverage device. It starts with a wireless communication device camping on a base node in enhanced coverage mode. This is the active base node, hereinafter called first base node. Typically the following steps are carried out after registering on the first base node. Further other triggers, like a time trigger, a certain event, e.g. a measured quality of service (QoS) indicates bad coverage or a return from connected or other mode to idle mode are also advantageous for starting the inventive method.

Hence the method starts with the step of measuring signaling from at least one second base node. This second base nodes at least needs to be situated that near to the wireless communication device to allow receiving enough signaling power that it can in any way be detected. Should no such second base node be available, the method would stop here. If more than one base node be detectable for the wireless communication device, then the method steps are repeated for each base node.

When sufficient signaling from said second base node is received at the wireless communication device it is determined an indication relating to the camping priority of said second base node. Preferably this is happening by determining the absolute camping priority. Alternatively it is sufficient to figure out if the camping priority is higher than the camping priority of the first base node.

This indication is preferably determined by decoding broadcasted information from the second base node, in particular through a system information block (SIB) from the base node. When the second base node is configured to populate a SIB with the information if it is configured to operate under enhanced coverage mode and/or if it is operating under enhanced coverage mode resp. normal coverage mode, then the wireless communication device is able to decode this information. Additionally or alternatively when the wireless communication device retrieves this information through enhanced or normal coverage decoding, that is to say is the base node operating in enhanced or normal coverage mode, it is able to figure out if the base node has a higher camping priority than the active base node.

Hence as decisive part of the inventive method the following conditions need to be checked. The first condition is the question if the second base node has a higher camping priority than the first base node. Only in this case the following steps need to be carried out. Otherwise—when a lower camping priority than the first base node applies—the base node would be ignored for re-selection. Or—when the same camping priority as the first base node applies—it first needed to check for other neighbouring base nodes who could provide a higher camping priority before taking the respective base node with same camping priority into account.

As a second condition it is checked if the second base node with higher camping priority is supporting enhanced coverage mode for the same camping priority. Although the second base node is currently assumed to operate in normal coverage mode, it would be an option for the wireless communication device to operate in enhanced coverage mode with the second base node. In that case the second base node would be downgraded in terms of camping priority and equally handled as a base node with the same camping priority. In that case the second base node would be handled as a third base node in the sense of this inventive method.

As a last condition it is then checked, if the measured signaling from the second base node indicates insufficient suitability for camping on the second base node in normal coverage mode. Even if the wireless communication device is capable to retrieve signals from a base node it may not provide enough power for the wireless communication device to camp on the base node or the wireless communication device may need to receive a larger amount of repetitions of a signal than with the current serving base node.

That means the second base node is not suitable for reselection. Hence, the wireless communication device would not decide to leave the first base node and camp on the examined second base node, though it provides a higher camping priority.

With that finding the examined second base node is effectively ruled out for this task of finding better base nodes.

A normal wireless communication device would continuously repeat the described operation for further second base nodes which are in any way detectable, and eventually find out that the second base nodes with higher camping priority are in the current situation not suitable for servicing the wireless communication device in normal coverage mode.

However when the wireless communication device is moving e.g. in a car, then this could nevertheless happen and would make sense. Out of that reason the same operation is started quickly again. In that case the measurement for normal behavior and the suitability criteria evaluation is by now performed once per discontinuous reception (DRX) cycle, i.e. every few seconds.

This is in particular disadvantageous in case of a wireless communication device which is effectively not moving. In order to cope with that, the inventive method further comprises to suspend the measurement of signaling of the second base node for a per se unlimited time in case no suitable second base node is detected.

This also applies to other second base nodes with higher camping priority than the first base node, should they fulfill the conditions mentioned above. Preferably the wireless communication device memorizes the affected base nodes by appropriate identifiers, including synchronization channel and P-CID, physical cell ID etc. for a quick detection in later steps. With that in a later step where base nodes are to be evaluated, those base nodes supporting higher camping priority are quickly identified and the wireless communication device will not invest in measuring further signals from them as long as measurement is suspended for those base nodes.

Instead the retrieved signals from a third base node, which is qualified by having the same camping priority as the first base node, are measured at the wireless communication device.

As this third base node is supposed to support enhanced coverage mode, the wireless communication device has then the option to switch to a base node supporting enhanced coverage mode although normal coverage base nodes are in reach for the wireless communication device.

In effect this means that the next iteration of finding a base node which is better suitable for the wireless communication device is not taking into account base nodes with higher camping priority. This is advantageous as it leads to an improved power consumption behavior by the avoidance of measuring the signaling of base nodes to which it is known that a reselection cannot happen.

In order to evaluate if the third base node is better suited for the wireless communication device certain options are possible. According to a preferred embodiment it is proposed a method wherein said third base node is supporting enhanced coverage, and the method further comprising the step of determining the repetition rate sufficient for decoding the signals from the third base node, executing a reselection to the third base node under the condition that said repetition rate is lower by a preconfigured threshold than the repetition rate sufficient for decoding the first base node.

This embodiment assures that the wireless communication device selects a base node which signals are retrievable with the least repetitions. As in enhanced coverage mode the wireless communication device compensates the limited received power by a plurality of reading resp. evaluation repetitions, camping on a base nodes with a need for more repetitions for the same amount of data consumes more power at the wireless communication device than a base node with a lower repetition rate.

Hence, besides the option of leaving enhanced coverage mode a wireless communication device operating under enhanced coverage conditions would also try for the sake of power saving to minimize the needed coverage enhancement. The higher the needed coverage enhancement the more repetitions are needed in RX and TX direction. The relation between coverage enhancement and required repetitions is not linear i.e. the number of repetitions drastically increase depending on information size and required coverage enhancement (dB).

As a consequence a wireless communication device operating in enhanced coverage mode preferably limits also its measurement activities towards other base nodes supporting enhanced coverage operation if the required amount of repetitions is larger or equal compared to the amount of repetitions of a signal required from the current active base node.

It is according to another preferred embodiment foreseen a method further comprising the step of stopping measurements of signals of a third base node when the detected repetition rate for said third base node is above the repetition rate required for reselection.

Thus during the evaluation of a third base node the measurement is preferably terminated once it becomes clear that a better repetition rate than for the first base node cannot be achieved.

With that preferred embodiment it is foreseen to further improve the power consumption footprint of the wireless communication device by suggesting additional criteria for a selection of the appropriate enhanced coverage base node for a wireless communication device.

According to a preferred embodiment it is proposed a method comprising prior to the step of determining camping priority the step of determining if the wireless communication device is operated stationary, and the step of determining camping priority of the second base node is only carried out under the condition that the wireless communication device is operated stationary.

This embodiment is advantageous in particular for those wireless communication devices where it is not clear from the start that they are operated stationary. Hence it is suggested to check in advance if the wireless communication device is operated stationary, and only if that is the case to carry on with the described method steps.

For figuring out of a wireless communication device is operated stationary a couple of methods are known. The most reliable option is a manual or automatic setting. This in particular applies in case of a modular approach of the wireless communication device comprising a wireless module providing connectivity and a controlling appliance controlling the wireless communication device and in particular the wireless module. When the wireless communication device is a fixed device, e.g. a metering device securely fixed to the electricity line, then the controlling appliance informs the wireless module with a command, in particular an AT-command, about the fact that it is operated stationary. A manually launched command is another option covered under this embodiment.

Alternatively with additional sensors being part of the wireless communication device, like those used for positioning, it is easily decided, if the wireless communication device is operated stationary for a relevant amount of time. If such additional equipment is missing further a comparison of measurement e.g. of the received power from one or more base nodes is preferably taken into account. Here power may also mean the amount of averages of a signal to achieve sufficient confidence level. If this is generally constant, the wireless communication device is deemed to be operated stationary. Further cell-positioning measures are usable for this purpose.

As the inventive method is advantageous preferably for those wireless communication devices which are operated stationary, with this embodiment this condition is tested before the inventive method is applied.

According to a preferred embodiment it is proposed a method wherein the step of suspending is carried out under the condition that at least one of the steps of measuring signaling and determining camping priority is repeated until a termination condition is met.

With that embodiment the step of suspending of measuring signals of base nodes with higher camping priority than the active base node is not carried out at the first occurrence of a measured signaling showing that the second base node is not suitable for camping of the wireless communication device. Instead at least the steps of measuring and determination are carried out repeatedly until a termination condition is met.

Such a termination condition is in a first preferred embodiment a timer. In a second preferred embodiment it is a threshold number of consecutive repetitions of measuring and/or determination with the same result.

When the termination condition is met, then the wireless communication device has the confidence that higher camping priority base nodes are not nearby that can be sufficiently decoded.

With that embodiment temporary degradations of service or reachability, in particular through shadowing or fading effects, are taken out of the consideration. Hence the reliability of the method is increased.

With the described method the suspension of decoding base nodes with high camping priority is achieved. In the case of a stationary wireless communication device this assures a low power consumption during operation through reducing mobility handling. Nevertheless not only the wireless communication device may be subject to changes, this also applies to the cellular network. In the case of setting up new base nodes or—at least temporary—removing base nodes, the wireless communication device needs to be in the situation to react in case of such changes of environment.

In order to cope with that situation it is proposed another preferred method comprising the step of
starting with the step of suspending the measurements a first timer and
finishing the suspension once the first timer expired.

This embodiment preferably assures that the suspension of considering normal coverage devices is time barred. That means after a reasonable amount of time again at least once it is checked for the availability of base nodes operating with a higher camping priority than the active base node. As set out before this faces the situation of a changing cellular network topology in proximity of the wireless communication device. Such a change in cellular network topology in particular comprises introducing or removing a base node in the cellular network, either in the same radio access network (RAN) of the network operator or in a different RAN.

Effectively with such time barred suspension the embodiment reduces the amount of measurements of the higher camping priority base nodes. Such measurement reduction may in particular comprise leaving out a predefined amount of DRX cycles until the second base node is measured the next time. Preferably this amount of left out DRX cycles is increasing up to a predefined upper limit for consecutive measurement confirming the non-suitability of the measures second base node in normal coverage mode.

Alternatively or additionally it is proposed in another preferred embodiment a method comprising finishing the suspension of measurements upon occurrence of at least one event out of the group of:
a reselection to another base node,
a switch to connected mode,
a switch from connected mode to idle mode,
a registration at the base node, or
an indication received from the cellular network about a change of cellular network topology,
a restart of the wireless communication device.

As such the wireless communication device is upon occurrence of at least one of the mentioned events put in the position to re-evaluate the cellular networks topology. In a preferred combination with the previous embodiment the wireless communication device is able—both event and time based—to timely figure out if a suitable base node operating in higher camping priority appeared near to the wireless communication device.

Preferably the time and/or event trigger activates nothing more than carrying out the inventive method from the beginning. That means when the wireless communication device again considers base nodes with higher camping priority, in particular those operating in normal coverage mode. It may under the conditions of the inventive method again suspend measurements of the base nodes with higher camping priority.

Another advantageous embodiment copes with the situation that at the step of measuring signaling from at least a third base node no such third base node with the same camping priority is available. Hence it is proposed a method comprising the step of starting a second timer in case no suitable base node is detected and restarting measuring base nodes once the second timer expired.

According to that embodiment another timer for measuring base nodes after the preconfigured time is foreseen. As at this point in time the suspension of measuring base nodes with higher camping priority is still active, this means that only base nodes with the same camping priority than the first base nodes, hence third base nodes, are considered.

Alternatively in a further preferred embodiment a measuring of signaling from base nodes with lower camping priority than the first base node is suggested. Preferably it is suggested that the first and/or second timer is set in dependency of said repetition rate sufficient for decoding the first base node.

With that advantageous solution instead of a constant preconfigured timer a configuration of the timer is foreseen as a function of the level of enhanced coverage for the active base node. That is, the more repetitions are needed, i.e. the deeper the enhanced coverage is, the shorter is the timer. This is advantageous as with expiry of the first or second timer there is a chance of finding a better suited, and in particular in terms of power consumption preferable base node. Hence, this embodiment additionally supports the optimization of power consumption of a wireless communication device operating under enhanced coverage.

Generally the inventive method and its embodiment suggest a context specific solution for power consumption optimization of enhanced coverage wireless communication devices.

According to a second aspect of the invention it is proposed a wireless communication device operating in a cellular network comprising a plurality of base nodes, by operating in enhanced coverage mode with a first base node of the plurality of base nodes, wherein the wireless communication device is configured to:

measure signaling from at least one second base node of said plurality of base nodes, determine an indication relating to the camping priority of said second base node, in case the second base node has a higher camping priority than the first base node, and for said camping priority the second base node not supporting enhanced coverage mode, and said measured signaling indicates insufficient suitability of the second base node to serve the wireless communication device in normal coverage mode:

suspend measurement of signaling of the second base node, measure signaling from at least a third base node of said plurality of base nodes providing the same camping priority as the first base node.

The second aspect of the invention and its preferred embodiments share the advantages of the first aspect.

In a third aspect of the invention it is proposed a base node being part of a cellular network, configured to serve a plurality of camping wireless communication devices in enhanced coverage mode, further configured to provide to at least one of said wireless communication devices an indication relating to the camping priority of the base node for the wireless communication device.

According to this aspect it is proposed a base node of the cellular network, where the wireless communication device of the second aspect of the invention is communicating with. As part of the signaling relation between the base node and the at least one wireless communication device the base node according to this aspect provides information relating to the camping priority of the base node.

Such information comprises in particular the information if the base node is operating with enhanced coverage or normal coverage, resp. if the base node is able to operate in enhanced coverage.

Preferably such information is provided as part of a broadcast signal. In particular such broadcast signal is part of one of the SIBs broadcasted by each base node.

With that aspect it is advantageous on side of the wireless communication device to quickly figure out the camping priority of the respective base node. Hence when a wireless communication device is camping on a first base node with a given camping priority, then for carrying out the inventive method or one of the embodiments it is advantageous that the wireless communication device is put in the position to quickly determine for other detectable base nodes which camping priority they provide.

For this it is already sufficient to have an indication, e.g. if the camping priority is higher or not. Hence, when the wireless communication device gets from the base node the information that the base node is operating in normal coverage, then a wireless communication device currently operating with the active base node in enhanced coverage has all necessary information to work out that the respective base node has a higher camping priority than the active base node.

In a preferred embodiment it is proposed that the base node is further configured to indicate to at least one camping wireless communication device at least one value concerning suitability for camping in enhanced coverage mode on that base node, out of the group of:

the minimum reception level for operating in enhanced coverage mode, maximum evaluation density of suitability criteria in enhanced coverage mode.

With that embodiment the base node is configured to provide preferably in a SIB an indication to the wireless communication device which is preferably usable on side of the wireless communication device if it is able to camp on this base node in enhanced coverage. This is in particular achieved by providing a value relating to the minimum required receiver (RX) level for operation in enhanced coverage with the resp. base node ($Q_{ECRXlevmin}$).

With this value, the wireless communication device has the means to calculate the suitability, which means the cell reselection RX level value for the enhanced coverage base node ($S_{EC}$rxlev) adapted from the respective reselection criteria calculation of TS36.304 (V12.5.0, section 5.2.3.2) for enhanced coverage operation:

$$S_{EC}\text{rxlev} = Q_{ECrxlevmeas} - (Q_{ECrxlevmin} + Q_{ECrxlevminoffset}) - P_{ECcompensation}$$

with $Q_{ECrxlevmeas}$=measured/evaluated cell RX level value in enhanced coverage achieved by RSRP. Here evaluated refers to a normalized measurement if the result is achieved by averaging over several samples.

$Q_{ECrxlevminoffset}$=Offset to the signaled $Q_{ECrxlevmin}$ taken into account in the $S_{EC}$rxlev evaluation as a result of a periodic search for a higher priority PLMN.

$P_{ECcompensation}$=maximum TX power level of a wireless communication device in enhanced coverage in uplink minus maximum RF output power of the wireless communication device according to its power class.

When $S_{EC}$rxlev is above 0, then a reselection is recommended.

When the RX level of the base node is not sufficient, then the wireless communication device knows that the base node is not suitable for camping. Alternatively the maximum evaluation density of suitability criteria is provided which indicates the maximum amount of repetitions the base node is configured to provide for dedicated signaling to a wireless communication device. Even though the wireless communication device is able to decode practically indefinitely repeated broadcasts, the same will not apply for dedicated signaling. This is limited through this indicator, which preferably is made available to the wireless communication devices.

Preferably either of this indication is provided as part of a SIB.

Even if the minimum reception level is not reached, still the wireless communication device might be able through sufficient repetitions in enhanced coverage mode to read out the SIBs. Nevertheless that does not mean that camping in enhanced coverage mode is possible, when a SIB can be decoded.

This embodiment helps sorting out base nodes for reselection decisions which are basically no real candidates for camping.

In a further preferred embodiment it is suggested a base node configured to receive a message from the cellular network about a change in cellular network topology, and after that to indicate to at least one camping wireless communication device said change in cellular network topology.

With this embodiment the cellular network provides assistance for the proposed wireless communication device according to the first and second embodiment of the invention. As it is set out above, when according to the inventive method measuring signaling from base nodes with higher camping priority is suspended, there might be situations where it is recommended for the wireless communication device to check again, if now the situation has changed.

As part of that an event based termination of the suspension is proposed. One of these events is an indication about a change of cellular network topology. This indication is according to this embodiment provided by the base node.

It requires knowledge from the cellular network resp. certain entities in the cellular network responsible for the respective base node that the topology has changed. Preferably this information is only provided to a subset of the base nodes being part of the cellular network. Preferably the base nodes of the tracking area where a topology change has happened are informed only.

As it is shown this invention advantageously solves the depicted problem and suggests a reliable solution for operating low-cost low-power wireless communication devices in a cellular network with base nodes supporting enhanced coverage mode. Further a solution is proposed for determining the suitability level of enhanced coverage supporting base nodes on the side of the wireless communication device.

BRIEF DESCRIPTION OF THE DRAWINGS

The following description and the annexed drawings set forth in detail certain illustrative aspects and are indicative of a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a wireless communication device 1 of the type to which the present invention is applied as an embodiment in the situation where the invention would typically show the most advantageous effect. As such the wireless communication device 1 is in particular an electricity metering device located in the basement 11 of a building 10. Other devices located in areas with impacted air interface would also take advantage of the invention, like a vending machine in a parking garage, an eHealth monitoring device in a shielded hospital area, control devices of wind or photovoltaic installations in a remote area etc.

Figure 1:
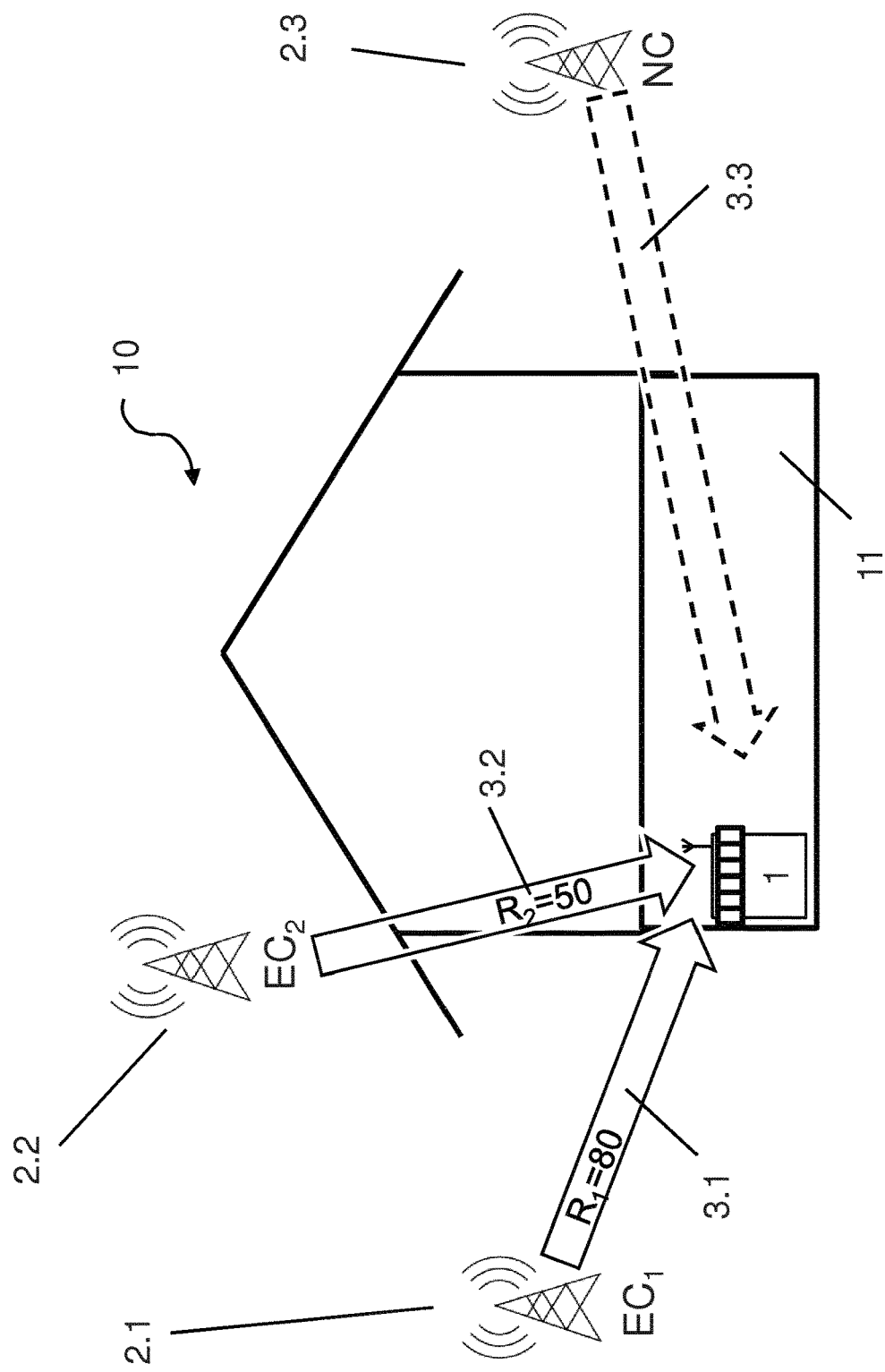
FIG. 1 represents the situation of a wireless communication device according to the prior art, for that the invention is designed.

In the shown exemplary embodiment the wireless communication device 1 is able to retrieve signals from three base nodes 2.1, 2.2, 2.3 of a cellular network. Base nodes 2.1 and 2.2 are able to be operated in enhanced coverage mode ($EC_1$, $EC_2$). Further base node 2.1 is the active base node, that means the base node the wireless communication device is currently camping on. The wireless communication device is operating in enhanced coverage mode $EC_1$ with base node 2.1. The signaling connection 3.1 between the wireless communication device 1 and base node 2.1 is qualified by a certain set of parameter, including the repetitions $R_1$ needed to reliably decode the signals from the base node 2.1 at the wireless communication device 1.

Generally the same applies to the signaling connection 3.2 from base node 2.2 to the wireless communication device, which is however not the active base node.

Base node 2.3 is only operated in normal coverage mode NC. However, due to the situation of the wireless communication device 1 in the basement 11 and the distance of base node 2.3, the signaling connection 3.3 is too weak for successfully decoding the signals from the base node 2.3 in normal coverage mode at the wireless communication device 1.

However, the wireless communication device 1 detects signals from base node 2.3. As the base node 2.3 is operated in normal coverage mode NC, the base node has assigned a higher camping priority than the base nodes 2.1, 2.2, which are operated in enhanced coverage mode.

According to the defined cellular technology standard the wireless communication device 1 repeatedly has to execute measurement on the signals 3.3 from base node 2.3, just for the sake of a quick reaction for allowing a reselection to a base node with higher camping priority, should it be suitable for camping.

In this example it can easily be seen, that these measurement are carried out due to a hope for an improvement of signaling connection 3.3 which will merely be realised in the near future. Hence these measurements and the power consumed for them are in the vast majority of cases completely in vain.

Furthermore this blocks the possibility to realize possible power savings. As it can be seen the signaling connection 3.1 with active base node 2.1 requires a repetition rate $R_1$ of 80. That means, for each portion of retrieved data 80 repetitions as part of the enhanced coverage mode are necessary.

Besides is another base node 2.2 supporting enhanced coverage mode, for which the signaling connection 3.2 only has a repetition rate $R_2$ of 50. So the same portion of data would be retrieved with approx. two third of repetitions, and far less spent power compared to base node 2.16. The mere availability of a normal coverage base node hence blocks a reselection to a base node with better power consumption conditions.

Figure 2:
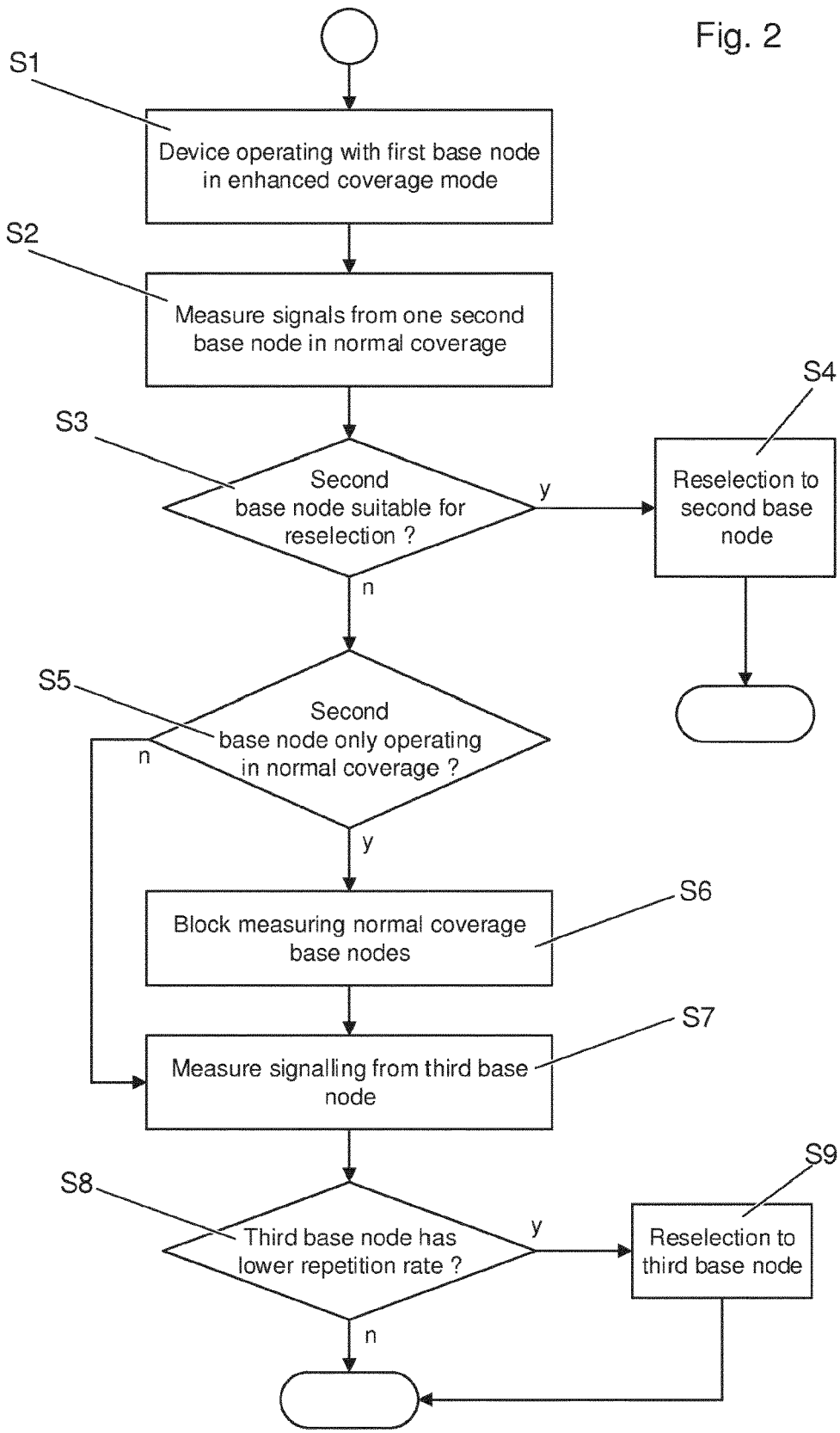
FIG. 2 shows in a flow chart a preferred embodiment of the inventive method.

For improving this situation it is proposed the embodiment of the inventive method as shown in FIG. 2. The process starts in step S1 with a wireless communication device 1 operating with a first base node 2.1 in enhanced coverage mode $EC_1$. It is one possible variant of the embodiment that the wireless communication device just before started to camp on the first base node, that starts the described process. In another variant the following steps are carried out due to a trigger, like an event or a timer.

In any case the process continues with step S2, with a measurement of signals from the one detectable second base node. The second base node is qualified by the fact that it is operating in normal coverage mode. Only for the case that with such measurements the existence of the second base node is detected the following steps apply. Due to the fact that the second base node is operating in normal coverage, it has a higher camping priority than the first base node.

If the measurements show in step S3 that the second base node in normal coverage mode is suitable for camping, according to the standardized suitability criteria, in step S4 the wireless communication device conducts a reselection to the second base node and continues operating in normal coverage mode. This is the known and envisaged handling of a wireless communication device operated in enhanced coverage in order to allow changing to a normal coverage base node as soon as it is available. Should the second base node not be suitable for camping, then the process jumps to step S5.

In step S5 it is according to this embodiment contested if the second base node is capable of operating in enhanced coverage mode. If not then in step S6 the measuring of normal coverage base nodes is suspended. As set out before, it is only one second base node detected. If more than one second base nodes operating in normal coverage mode were found, the steps S3 to S5 were carried out for each of them. When it then turns out that no second base node is suitable for the wireless communication device—otherwise the wireless communication device would carry out a reselection in step S4—then in step S6 further measuring of normal coverage base nodes is suspended resp. blocked.

Hence, in steps S7 the wireless communication device is able to measure signaling from third base nodes, this means those operating in enhanced coverage mode. Should the examined second base node in step S5 indicate the possibility to operate in enhanced coverage mode, it would then be considered in step S7 as well. In that case this base node or any other third base node would have the same camping priority than the first base node. Nevertheless base nodes only operating in normal coverage are not considered then.

Among the detectable enhanced coverage base nodes the wireless communication device would have the task of selecting the base node which suits best to the wireless communication device's needs. Hence in step S8 as key factor in this case—besides known criteria—the power consumption is considered, which is directly related to the number of repetitions necessary for decoding the base nodes signals. Consequently it is in step S8 preferably compared the repetition rate of the first base node with that of the examined third base node.

If the repetition rate of the third base node is lower than the repetition rate of the first base node, then the wireless communication device carries out a reselection to the third base node in step S9. This is the simple case for exactly one available third base node.

If more third base nodes are available, then it is first figured out in step S8 if any of them has a lower repetition rate than the first base node, and if so, in step S9 a reselection to the base node with the lowest repetition rate is carried out. Other criteria for reselection are in this simplified exemplifying embodiment assumed as being equal for all examined base nodes. Typically those criteria, in particular known suitability criteria, would also come into play.

If the check in step S8 shows no lower repetition rate than the first base node the wireless communication device continues camping on the first base node. Preferably after the last steps, irrespective if a reselection was carried out or not, a timer is started, after which expiry the procedure at step S7 is restarted.

As a matter of fact due to the blocking operating in step S6, no remarkable power resources need to be invested for checking base nodes with higher camping priority by now.

Figure 3:
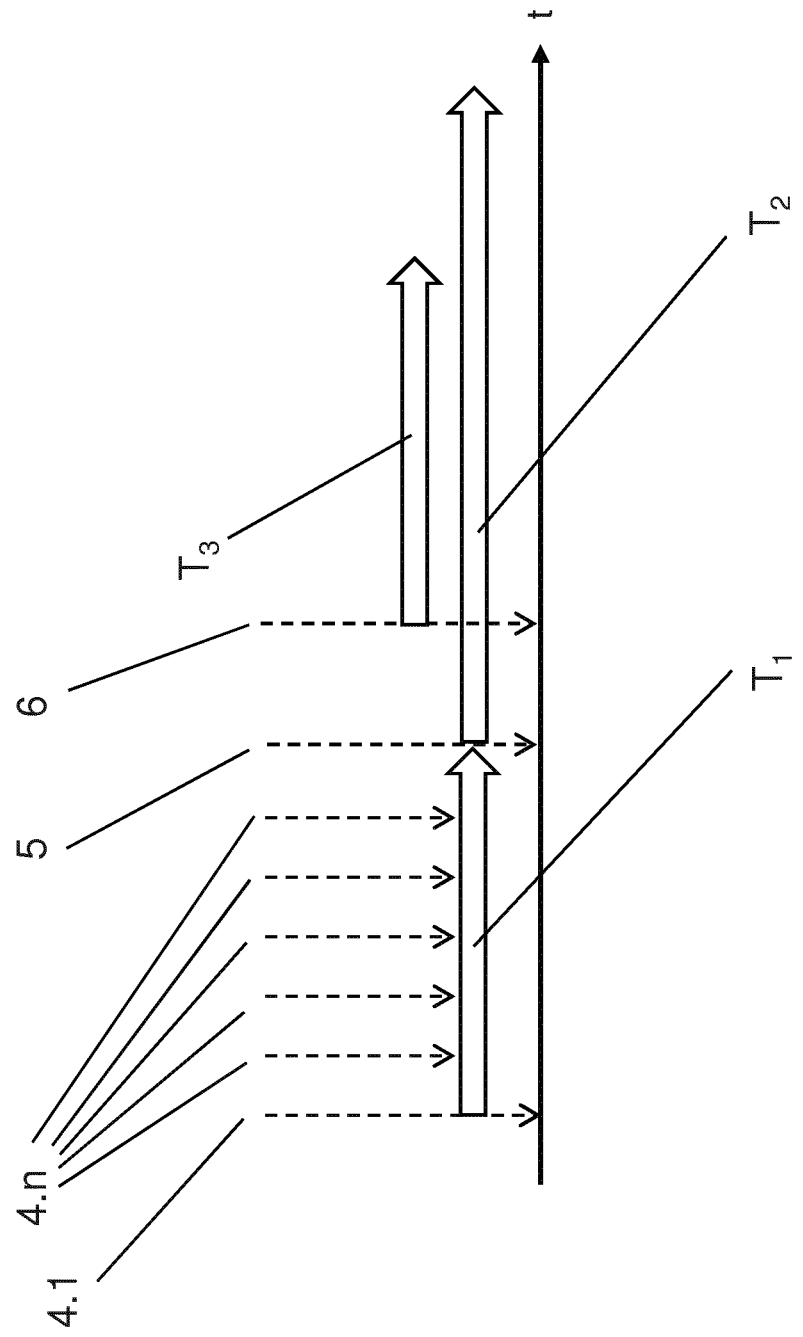
FIG. 3 represents a time diagram indicating the relation of timers according to preferred embodiments of the invention.

The preferred timer handling, which allows for the wireless communication device to sensitively act in the cellular network in terms of power consumption and nevertheless detect major changes is shown for a preferred embodiment of the invention in FIG. 3.

This diagram shows on a time bar t the succession of timers used according to a preferred embodiment of the invention.

The process starts with the measuring event 4.1 where the wireless communication device 1 measures signaling from a second base node combined with a determination of the camping priority. If the second base node has a higher camping priority than the active base node, but the signaling is insufficient suitable for camping on measured second base node, then timer $T_1$ is started.

This timer $T_1$ allows for a repetition of measurements which are shown with arrows 4.n. This is typically carried out according to the DRX cycle, i.e. one measurement 4.n per DRX cycle. If at the expiry of timer $T_1$ each measurement 4.n confirmed the findings from measurement 4.1, in particular the insufficient suitability for camping, then the measurement of signaling is suspended for this base node, resp. for base nodes with higher camping priority.

In this situation two activities are carried out according to this embodiment of the invention, simultaneously or in any order:

First timer $T_2$ is started. This is a timer which governs when a base node with higher camping priority is taken into account for reselection again. In other words, when will the suspension of measurements terminate. This timer $T_2$ is expected to last much longer than timer $T_1$. While timer $T_1$ is preferable in the range of seconds/minutes, timer $T_2$ is preferably at least in the range of minutes/hours, if not days, or a multitude of DRX cycles.

It is further preferred that $T_1$ is dynamically growing up to a predefined maximum level upon consecutive detections of not suitability of the second base node.

Further the length of timer $T_2$ is in particular depending upon other events that are foreseen to be considered for an alternative termination of the measurement suspension for higher camping priority base nodes. That is, if the cellular network sends an indication about a change in cellular network topology—like it is suggested according to a preferred embodiment of the third aspect of the invention—and additionally the wireless communication device is operated stationary and/or detects as another event that it is moving, then timer $T_2$ can without remarkable shortcomings in operation be set in the range of days. After expiry of timer $T_2$ preferably not a whole set of measurements required in $T_1$ is needed, possibly even with one measurement of signals from the second base node the original finding might be confirmed.

The second activity to be carried out after timer $T_1$ expired is the measurement 5 of signaling from at least a third base node, which is a base node with the same camping priority than the active base node.

This measurements in particular relates to a couple of base nodes which are detectable for the wireless communication device.

Should it turn out that no third base node is found which would be suitable for a reselection—this situation is indicated in the figure with arrow 6—then timer $T_3$ is started. Timer $T_3$ governs when again a measurement of signaling from base nodes with the same camping priority is carried out.

The duration of timer $T_3$ is preferably depending upon the enhanced coverage repetition rate of the active base node. This setting allows a quick change to a base node with a lower, and hence less power consuming, repetition rate.

Hence, the shown advantageous embodiments show that the goal of the invention is achieved in a manner which does not require remarkable additional resources and is fully adapted to the situation of wireless communication devices where the enhanced coverage mode was developed for.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for operating a wireless communication device in a cellular network, the cellular network comprising a plurality of base nodes, and the wireless communication device is operating in enhanced coverage mode with a first base node of the plurality of base nodes,
wherein the method comprises the steps of:
measuring signaling from at least one second base node of said plurality of base nodes,
determining an indication relating to the camping priority of said second base node,
in case the second base node has a higher camping priority than the first base node, and for said camping priority the second base node does not support enhanced coverage mode and said measured signalling indicates insufficient suitability of the second base node to serve the wireless communication device in normal coverage mode:
suspending measurement of signaling of the second base node,
measuring signaling from at least a third base node of said plurality of base nodes providing the same camping priority as the first base node.

2. Method according to claim 1,
wherein the step of suspending is carried out under the condition that at least one of the steps of measuring signaling and determining camping priority is repeated until a termination condition is met.

3. Method according to claim 1
comprising the step of
starting the step of suspending the measurements with a first timer, and
finishing the suspension once the first timer expired.

4. Method according to claim 1,
comprising finishing the suspension of measurements upon occurrence of at least one event out of the group of:
a reselection to another base node,
a switch to connected mode,
a switch from connected mode to idle mode,
a registration at the base node, or
an indication received from the cellular network about a change of cellular network topology,
a restart of the wireless communication device.

5. Method according to claim 1,
wherein said third base node is supporting enhanced coverage, and the method further comprising the step of determining the repetition rate sufficient for decoding the signals from the third base node,
executing a reselection to the third base node under the condition that said repetition rate is lower by a preconfigured threshold than the repetition rate sufficient for decoding the first base node.

6. Method according to claim 5,
further comprising the step of stopping measurements of signals of a third base node when the detected repetition rate for said third base node is above the repetition rate required for reselection.

7. Method according to claim 3,
comprising the step of starting a second timer in case no suitable base node is detected and restarting measuring base nodes once the second timer expired.

8. Method according to claim 7,
wherein the first and/or second timer is set in dependency of said repetition rate sufficient for decoding the first base node.

9. Method according to claim 1,
comprising, prior to the step of determining camping priority, the step of determining if the wireless communication device is operated stationary,
and the step of determining camping priority of the second base node is only carried out under the condition that the wireless communication device is operated stationary.

10. Wireless communication device operating in a cellular network comprising a plurality of base nodes, by operating in enhanced coverage mode with a first base node of the plurality of base nodes,
wherein the wireless communication device is configured to:
measure signaling from at least one second base node of said plurality of base nodes,
determine an indication relating to the camping priority of said second base node,
in case the second base node has a higher camping priority than the first base node, and for said camping priority the second base node is not supporting enhanced coverage mode, and said measured signalling indicates insufficient suitability of the second base node to serve the wireless communication device in normal coverage mode:
suspend measurement of signaling of the second base node,
measure signaling from at least a third base node of said plurality of base nodes providing the same camping priority as the first base node.

11. Wireless communication device according to claim 10,
wherein the wireless communication device is configured to suspend measurements under the condition that at least one of said signaling measurement and camping priority determination is repeated until a termination condition is met.

12. Wireless communication device according to claim 10,
wherein the wireless communication device is further configured to finish suspension of measurement upon occurrence of at least one event out of the group of:
a reselection to another base node,
a switch to connected mode,
a switch from connected mode to idle mode,
a registration at the base node, or an indication received from the cellular network about a change of cellular network topology, a restart of the wireless communication device, expiry of a first timer, started with the start of said suspension of measurements.

13. Wireless communication device according to claim 10, wherein said third node is supporting enhanced coverage, and the wireless communication device is further configured to:

determine the repletion rate sufficient for decoding the signals from the third base node, and execute a reselection to the third base node under the condition that said repetition rate is lower by a preconfigured threshold than the repetition rate sufficient for decoding the first base node.

14. Wireless communication device according to claim 10, further configured to start a timer in case no suitable base node is detected and to restart measuring base nodes once the timer expired.

15. Wireless communication device according to claim 10, further configured to determine, prior to the determination of camping priority, if the wireless communication device is operated stationary, and to carry out the determination of camping priority only under the condition that the wireless communication device is operated stationary.

* * * * *